United States Patent [19]

Warwick

[11] 3,852,962
[45] Dec. 10, 1974

[54] MASTER CYLINDER PARTIAL SYSTEM DISPLACEMENT MODIFIER

[75] Inventor: Edward H. Warwick, Englewood, Ohio

[73] Assignee: General Motors Corporation, Detroit, Mich.

[22] Filed: Mar. 26, 1973

[21] Appl. No.: 344,719

[52] U.S. Cl.................... 60/561, 60/535, 200/82 D
[51] Int. Cl............................................... F15b 7/00
[58] Field of Search ...... 60/534, 535, 561; 303/6 C, 303/84 A; 300/82 A, 82 D

[56] References Cited
UNITED STATES PATENTS

| | | | |
|---|---|---|---|
| 2,879,791 | 3/1959 | Hollmann | 303/84 A |
| 3,228,194 | 1/1966 | Blair | 60/561 |
| 3,737,602 | 6/1973 | Bueler | 200/82 D |

Primary Examiner—Martin P. Schwadron
Assistant Examiner—A. M. Zupcic
Attorney, Agent, or Firm—D. D. McGraw

[57] ABSTRACT

A brake system in which a dual master cylinder is connected to actuate dual braking circuits. A shuttle piston of the type utilized to actuate a brake pressure loss warning switch also operates to control a master cylinder displacement modifier, the shuttle piston being a part of the modifier. The opposed chambers in the bore containing the shuttle piston are connected by a passage having a check valve therein, the passage being closed upon brake pressure loss in one of the brake circuits and also being closed when both brake circuits are at substantially the same pressure. When brake pressure loss occurs in the other brake circuit, the port to that circuit from the modifier is closed and pressurized fluid from both master cylinder pressurizing chambers passes through the above mentioned connecting passage and check valve to the one brake circuit. This permits the substantially full displacement of both master cylinder chambers to be used to actuate the one brake circuit upon pressure loss in the other brake circuit.

3 Claims, 1 Drawing Figure

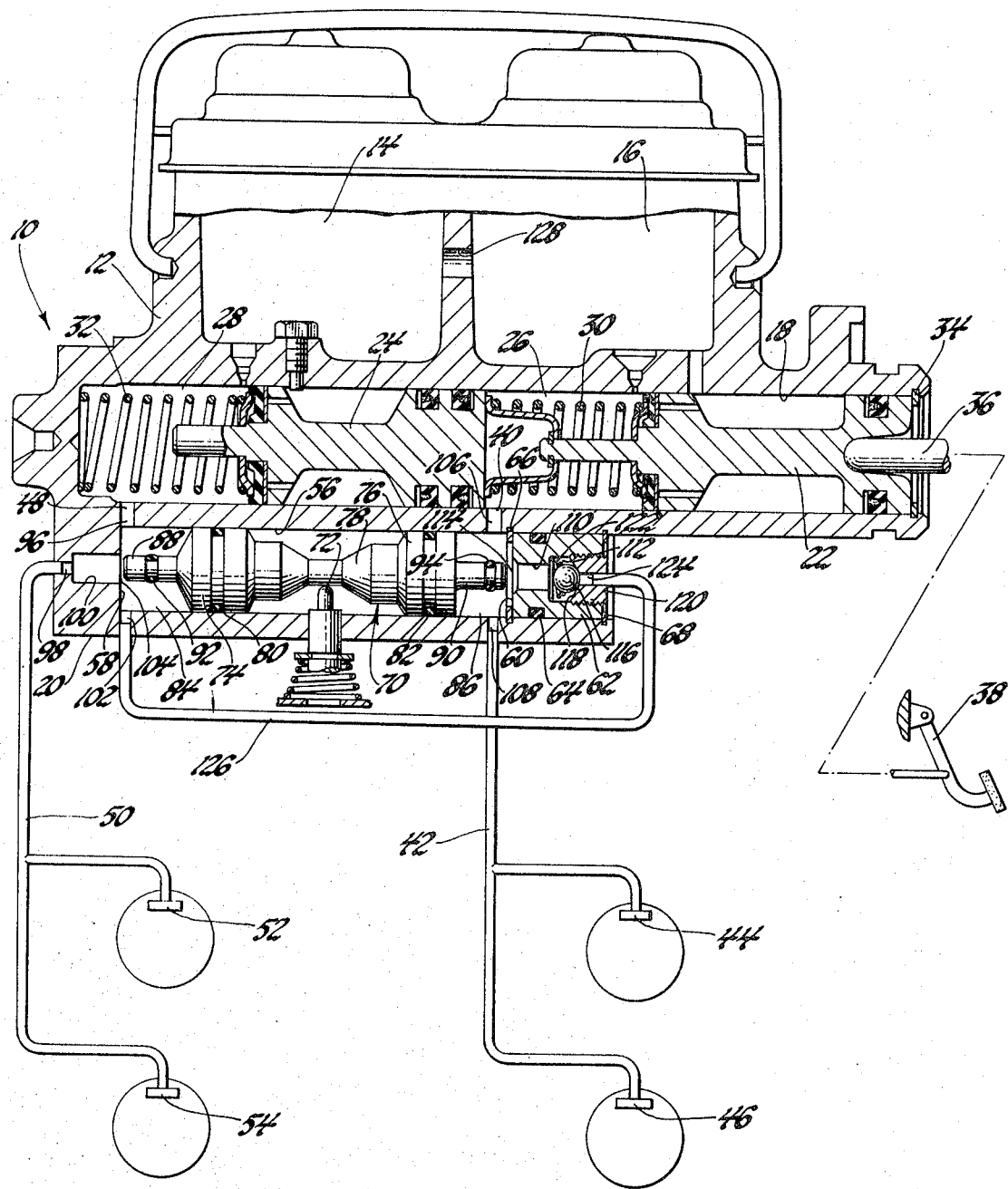

MASTER CYLINDER PARTIAL SYSTEM DISPLACEMENT MODIFIER

The invention relates to a brake system in which dual pressurizing chambers in a master cylinder respectively pressurize dual pressure circuits, and more particularly to such a system containing a master cylinder displacement modifier which becomes operative when one of the brake circuits suffers a pressure loss during brake operation.

Vehicle brake systems currently used commonly include a dual master cylinder having separate pressurizing chambers actuated by tandemly positioned pressurizing pistons. Each chamber operates a separate brake circuit, the typical arrangement having the front wheel brakes in one circuit and the rear wheel brakes in another circuit. A failure warning switch arrangement is also provided, the actuating mechanism including a shuttle type piston having opposed surfaces which are respectively acted upon by pressures from the two master cylinder pressurizing chambers. A switch is arranged to be sensitive to movement of the piston in response to a predetermined amount of pressure differentiation acting thereacross. Thus when one side of the piston is exposed to less pressure than the other side by a predetermined amount, the piston moves toward the side having the less pressure acting thereon and actuates the warning switch, which in turn energizes a suitable operator warning circuit. The piston is arranged to move in either direction, depending upon the side which suffers the pressure loss.

The invention is an improvement on the arrangement described above, and is particularly advantageous when arranged so that pressure loss in the brake circuit containing the front brakes results in a closing of the fluid supply for that circuit and a diversion of the brake pressure generated in the master cylinder and normally directed to that circuit so that the brake fluid and pressure is delivered instead to the brake circuit containing the rear brakes. This permits the fluid displacement of the master cylinder to be more fully utilized and results in less loss of brake fluid. This is accomplished by providing a passage which fluidly interconnects the chambers situated at the opposed surfaces of the piston when the brake circuit containing the front brakes has suffered a pressure loss. The interconnecting passage is closed when the system is in its normal operating condition with the opposed pressures being substantially balanced. It is also closed when a pressure loss occurs in the brake circuit containing the rear brakes.

IN THE DRAWING

The FIGURE illustrates the mechanism embodying the invention, the mechanism having parts broken away and in section and schematically illustrated as installed in a vehicle wheel brake system.

The master cylinder assembly 10 includes the housing 12 which is formed to provide reservoir chambers 14 and 16, cylinder bore 18 and the modifier housing section 20. The master cylinder is of a typical dual chamber construction in which a primary piston 22 and a secondary piston 24 are reciprocably mounted in bore 18 so as to define therein a primary pressurizing chamber 26 and a secondary pressurizing chamber 28. A caged spring 30 in chamber 26 acts between the pistons 22 and 24 and a piston return spring 32 in chamber 28 acts between the closed end of bore 18 and piston 24 to return both pistons to the released position as established by piston stop 34. A push rod 36 is schematically illustrated as being actuated by a brake pedal unit 38 to apply the brakes. Brake application is accomplished by moving piston 22 forwardly to compress brake fluid in chamber 26 and thereby move piston 24 forwardly to compress brake fluid in chamber 28. Outlet 40 of chamber 26 is operatively connected in a manner to be described to the brake circuit 42. In the particular brake system schematically illustrated, brake circuit 42 contains the rear wheel brakes 44 and 46. Outlet 48 of chamber 28 is operatively connected to the brake circuit 50, which in the brake system schematically illustrated contains the front wheel brakes 52 and 54. This is the general dual master cylinder and dual brake circuit arrangement in common use in passenger car vehicles currently being manufactured.

The modifier housing section 20 has a cylinder bore 56 formed therein and provided with a closed bore end 58 at one end and a closed bore end 60 at the other end. The bore end 60 may be provided by a suitable plug 62, which is sealed by seal 64 and retained in position by snap rings 66 and 68. A shuttle piston 70 is reciprocably mounted in bore 56 and is of the same general type used in current production passenger car vehicle brake systems to actuate a brake pressure loss warning arrangement. Such arrangements are well known in the art, as exemplified in the disclosure of U.S. Pat. No. 3,709,563, issued Jan. 9, 1973. For purposes of illustration, a reciprocable switch plunger 72 is shown. The shuttle piston 70 has spaced lands 74 and 76 joined by a piston section 78 with smaller diameters than the lands. Piston section 78 is appropriately formed to actuate the plunger 72 and energize a warning circuit when the piston moves a predetermined amount in either direction from the center position shown under influence of sufficient pressure differential acting across the piston to so move it. Lands 74 and 76 are respectively provided with seals 80 and 82 so that the piston ends, in cooperation with the cylinder bore 56 and the bore ends 58 and 60, respectively define opposed pressure chambers 84 and 86. A plug valve element 88 extends from the face of land 74 and into chamber 84. A plug valve element 90 similarly extends from land 76 into chamber 86. The plug valve elements are respectively provided with circumferentially extending O-ring seals 92 and 94.

Pressure chamber 84 has an inlet 96 connected with the outlet 48 of master cylinder pressurizing chamber 28. It also has an axially aligned outlet 98 formed in cylinder bore end 58 and connecting with chamber 84 by a recess 100. Outlet 98 is connected to brake circuit 50. Recess 100 is positioned to receive plug valve element 88 in sealing relation under certain conditions, with seal 92 sealing the recess and therefore outlet 98 against fluid pressure communication with chamber 84. With the end of plug element 88 engaging the inner end of recess 100, land 74 is sufficiently spaced from end wall 58 so that inlet 96 remains in fluid communication with chamber 84. Another chamber outlet 102 connects with chamber 84 and is so axially positioned along the chamber side wall that it is also in communication with chamber 84 when the valve 104 (formed by valve plug element 88, seal 92, and recess 100) is closed as above described.

Chamber 86 is provided with an inlet 106 in fluid communication with outlet 40 of master cylinder pressurizing chamber 26. The chamber is further provided with an outlet 108, axially positioned along the chamber side wall in substantial alignment with inlet 106. Outlet 108 is fluid connected to brake circuit 42. The plug 62 forming end wall 60 has an axially extending stepped bore defining a passage 110 and a check valve chamber 112. Passage 110 is positioned to receive plug valve element 90 and its seal 94 therein when piston 70 moves sufficiently rightward as seen in the drawing. Therefore, the valve 114 (formed by passage 110, plug valve element 90 and seal 94) closes check valve chamber 112 against fluid communication with chamber 86 in this condition of operation. Check valve 116 is received in chamber 112 and urged against its seat 118, formed on valve seat plug 120, by spring 122. The valve seat plug 120 is sealingly secured in the outer end of the stepped bore of plug 62 and is formed to provide an axially aligned inlet 124 which extends through the valve seat 118 and is closed by the valve 116 when the valve is seated. A conduit 126 connects outlet 102 and inlet 124 in fluid communication.

During normal brake operation the brake fluid is pressurized in chambers 26 and 28 and passes through the chamber outlets 40 and 48, the opposed pressure chambers 84 and 86, and brake circuits 42 and 50 to actuate the front and rear wheel brakes. So long as the pressures acting on the opposed faces of shuttle piston 70 are substantially equal, the piston will remain in the position shown with the switch plunger engaging the smallest diameter central section of the piston section 78. The front brake pressure is also impressed through conduit 126 to check valve 116. However, the same pressure value acts on the side of check valve 116 exposed to chamber 86 through passage 110, and therefore, the check valve remains closed. When the brakes are released, all pressures in the brake circuits decrease at substantially the same rate and no movement of shuttle piston 70 occurs. However, should there be a pressure loss in the front brake circuit 50, for example, while the brakes are actuated, there will be an immediate pressure decrease in chamber 84 establishing a pressure differential acting across piston 70 tending to move the piston to the left as seen in the drawing. When this pressure differential is sufficiently great to overcome seal friction and the holding action of spring loaded switch plunger 72, the piston moves leftwardly and valve 104 closes. At the same time, plunger 72 is forced by the camming action of the piston to ride on to a greater diameter portion of the piston center section 78, thereby moving the plunger and actuating the brake warning circuit. With valve 104 closed, the brake supply pressure from master cylinder chamber 28 again pressurizes chamber 84. However, it now acts on a smaller effective area of land 74 since it no longer acts on the effective area of plug valve element 88. Therefore, the piston remains in the leftward position described. Due to clearance between the land 74 and end wall 58, the pressure from master cylinder chamber 28 is transmitted through conduit 126 to check valve 116 and is available to open that valve to provide any fluid displacement needed to the rear brake circuit 42 in conjunction with fluid displaced from chamber 26 when the displacement thereof has reached its maximum. Since the pressures in chambers 84 and 86 are the same, and the fluid in chambers 28 and 84, conduit 126 and inlet 124 is trapped, piston 24 does not move as piston 22 is moved to displace fluid from chamber 26 until piston 22 abuts piston 24, thereby exhausting the displacement volume of chamber 26. Further brake applying movement of push rod 26 then causes an additional increase in pressure in chamber 28 without a commensurate pressure increase in chamber 26, thereby causing valve 116 to open and permit the additional displacement of piston 24 in chamber 28 to be used. Thus, instead of having the limitation on fluid displacement to the rear brake circuit being that provided by the stroke of piston 22 until it effectively abuts piston 24, the displacement provided by the remaining stroke of piston 24 is also available and utilized. Upon brake release all of the displacement fluid absorbed by circuit 42, which must be returned to the master cylinder, is returned through chamber 26 and its compensation port to reservoir 16. A crossover port 128 in the wall separating chambers 14 and 16 will prevent overfilling of chamber 16 by allowing extra fluid to overflow into chamber 14. When the cause of the pressure loss in brake circuit 50 is repaired, the shuttle piston 70 is returned to its center position and the system is again operable in a normal manner.

When during normal brake operation the brake circuit 42 suffers a pressure loss, shuttle piston 70 moves rightwardly to close valve 114. Also, plug valve element 90 engages check valve 116 to limit the rightward movement of piston 70 and at the same time to hold the check valve closed. Land 76 severely restricts the passage of brake fluid through chamber 86, therefore decreasing the amount of brake fluid which might otherwise be lost through circuit 42. Meanwhile, brake fluid and pressure from master cylinder chamber 28 continues to supply circuit 50. The pressure in chamber 84, while transmitted through conduit 126 to check valve 116, does not exert sufficient force on that valve to open the valve because of the higher force acting to hold shuttle piston 70 to the right and therefore plug valve element 90 in engagement with the check valve.

What is claimed is:
1. For use in a brake system having a dual pressurizing chamber master cylinder and dual pressure circuits normally pressurized thereby upon brake actuation, a master cylinder displacement modifier comprising:

a housing having a bore therein defined by a side wall and first and second end walls;
a reciprocable piston sealingly received in said bore to define therewith a first pressure chamber at one bore end and a second pressure chamber at the other bore end, each pressure chamber having a pressure inlet port for receiving pressurized brake fluid from a pressurizing chamber of the master cylinder and a pressure outlet port for delivering pressurized brake fluid to a dual pressure circuit, the forces generated by pressures in said pressure chambers acting in opposite directions on said piston;
a recess in said first end wall at said first pressure chamber outlet port, a first plug valve element on said piston positioned to extend into said recess and close said first pressure chamber outlet port upon movement of said piston toward said first pressure chamber outlet port in response to a predetermined minimum pressure differential acting across said piston toward said first end wall;

a third port communicating with said first pressure chamber, a fourth port in said second end wall, and a fluid pressure conduit connecting said third and fourth ports;

a passage and a valve chamber in said second end wall communicating said second pressure chamber and said fourth port, a check valve in said valve chamber when closed interrupting communication between said valve chamber and said fourth port;

a second plug valve element on said piston positioned to extend into said passage in passage sealing relation upon movement of said piston toward said second end wall in response to a predetermined minimum pressure differential acting across said piston toward said second end wall, said second plug valve element being positioned to permit fluid communication between said second pressure chamber and said passage subject to the opening of said check valve, such position of said second plug valve element permitting the use of the master cylinder displacement of both pressurizing chambers thereof for pressurizing the brake circuit connected with the second pressure chamber outlet port when the other brake circuit has lost pressure and said first-mentioned predetermined minimum pressure differential is exceeded.

2. In a dual circuit brake system having separate first and second fluid pressure circuits,
a fluid displacement modifier including;
a housing having a closed end bore therein,
a piston reciprocably received in said bore and dividing said bore into first and second pressure chambers respectively located on one side and the other side of said piston,
first and second inlet port means respectively in said first and second fluid pressure circuits and respectively communicating with said first and second pressure chambers,
first and second outlet port means respectively in said first and second pressure circuits and respectively communicating with said first and second pressure chambers,
said piston being slidable in said bore in one direction from a center position to selectively close said first outlet port means on one side of said piston when said piston is moved in said one direction by a force differential of sufficient magnitude,
a fluid flow path between said first and second pressure chambers including bypass passage means communicating with said bore through separate bypass port means on each side of said piston with said piston arranged to close the bypass port means on the other side of said piston from said first outlet port means when said piston is moved in said bore in the other direction from said one direction by a force differential of sufficient magnitude,
and check valve means in said fluid flow path between said first and second pressure chambers and permitting fluid flow through said fluid flow path only in the direction from said first pressure chamber toward said second pressure chamber,
said first inlet port means being in fluid flow communication with said second outlet port means through said fluid flow path while said piston keeps said first outlet port means closed.

3. For use in a dual circuit brake system, a brake pressure circuit modifier comprising:
a first inlet port and a first outlet port adapted to be connected in series flow relation in a first brake pressure circuit,
a second inlet port and a second outlet port adapted to be connected in series flow relation in a second brake pressure circuit,
and means responsive in one brake system condition to pressure loss only at said first outlet port to close said first outlet port and divert brake pressure from said first inlet port to said second outlet port, so that both of said inlet ports supply brake pressure only to said second outlet port,
said means being responsive in another brake system condition to pressure loss only at said second outlet port to severely restrict said second outlet port.

* * * * *